US007499200B2

(12) United States Patent
Hamilton et al.

(10) Patent No.: US 7,499,200 B2
(45) Date of Patent: Mar. 3, 2009

(54) ACQUISITION AND ORGANIZATION OF DIGITAL IMAGES

(75) Inventors: David O. Hamilton, Ramona, CA (US); Steven T. Breidenbach, San Diego, CA (US); James E. Sutton, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1575 days.

(21) Appl. No.: 09/942,503

(22) Filed: Aug. 29, 2001

(65) Prior Publication Data

US 2003/0043420 A1     Mar. 6, 2003

(51) Int. Cl.
*H04N 1/04* (2006.01)
(52) U.S. Cl. .................. 358/474; 358/1.9; 358/527; 358/906; 382/313; 382/312; 345/781; 345/783; 348/207.1; 348/231.2
(58) Field of Classification Search .......... 358/474, 358/1.2, 1.15, 1.16, 504, 505, 514, 523, 537, 358/471, 473, 1.9, 906, 909.1, 527, 302, 358/1.6; 348/333.1, 231.99, 231.9, 231.3, 348/207.1, 231.2, 362; 382/313, 154; 345/781, 345/783, 845, 156; 400/76, 61
See application file for complete search history.

(56) References Cited

U.S. PATENT DOCUMENTS

| 5,027,117 | A | * | 6/1991 | Yoshida et al. ............... 341/132 |
| 5,398,684 | A | * | 3/1995 | Hardy ........................ 600/391 |
| 5,604,597 | A | * | 2/1997 | Imai ........................... 358/296 |
| 5,825,043 | A | * | 10/1998 | Suwa ......................... 250/548 |
| 6,034,785 | A | * | 3/2000 | Itoh .......................... 358/1.18 |
| 6,335,742 | B1 | * | 1/2002 | Takemoto .................... 715/781 |
| 6,385,346 | B1 | * | 5/2002 | Gillihan et al. ............. 382/254 |
| 6,480,304 | B1 | * | 11/2002 | Os et al. ..................... 358/474 |
| 6,535,298 | B2 | * | 3/2003 | Winter et al. ............... 358/1.16 |
| 6,686,930 | B2 | * | 2/2004 | Powers et al. ............... 715/724 |
| 6,775,381 | B1 | * | 8/2004 | Nelson et al. ................. 380/54 |
| 6,814,002 | B2 | * | 11/2004 | Orimoto ..................... 101/335 |
| 6,940,526 | B2 | * | 9/2005 | Noda et al. .................. 345/629 |
| 6,948,069 | B1 | * | 9/2005 | Teppler ...................... 713/178 |
| 7,113,306 | B1 | * | 9/2006 | Nakabayashi et al. ......... 358/1.9 |
| 7,124,191 | B2 | * | 10/2006 | McIntyre .................... 709/229 |
| 7,180,501 | B2 | * | 2/2007 | Marvit et al. ............... 345/156 |
| 7,403,641 | B2 | * | 7/2008 | Nakamoto et al. .......... 382/118 |

(Continued)

FOREIGN PATENT DOCUMENTS

EP            0944239          9/1999

(Continued)

OTHER PUBLICATIONS

JP4280330 A 19921006; Oct. 6, 1992; Matsushita Electric Ind Co Ltd; "File management device".

(Continued)

*Primary Examiner*—Negussie Worku (57) ABSTRACT

A system and method for organizing digital images automatically. A digital image is acquired and automatically converted into an image data file with an associated date, and stored into a file system folder associated with that date. When the digital image is to be acquired using an optical scanner, the method automatically acquires the image using predefined scanner settings that are appropriate to a photographic image to scan the item.

21 Claims, 7 Drawing Sheets

U.S. PATENT DOCUMENTS

| | | | |
|---|---|---|---|
| 7,414,759 B2 * | 8/2008 | Kellie et al. | 358/474 |
| 2002/0097452 A1 * | 7/2002 | Nagarajan | 358/505 |
| 2002/0140820 A1 * | 10/2002 | Borden, IV | 348/207.99 |
| 2002/0163669 A1 * | 11/2002 | Yamazaki et al. | 358/3.23 |
| 2003/0095197 A1 * | 5/2003 | Wheeler et al. | 348/241 |

FOREIGN PATENT DOCUMENTS

| | | |
|---|---|---|
| EP | 1182585 | 2/2002 |
| JP | 10126738 | 5/1998 |
| JP | 2001051877 | 2/2001 |
| JP | 2001160915 | 6/2001 |
| WO | WO0063834 | 10/2000 |

OTHER PUBLICATIONS

May 2001 White Paper ACDSee 3.1 (Update).

ACDSee User Guide (Apr. 25, 2001).

* cited by examiner

ACQUISITION AND ORGANIZATION OF DIGITAL IMAGES

BACKGROUND OF THE INVENTION

As the availability of inexpensive, photographic-quality computer printers has increased, there has also been an increase in the popularity of digital photography. Images can now be captured and printed with a quality that rivals those of traditional photographs. Many digital cameras automatically capture photographic images at the push of a button, storing them electronically in the camera on a memory device such as a flash card. The digital images can be uploaded to a computer. Large numbers of digital images can then be efficiently stored on media such as writeable or rewriteable CD-ROMs.

In addition to digital images captured by digital cameras, many users also use products incorporating optical scanning technology to create digital images from traditional photographs or other print media. One popular type of these products are multifunction (also known as "All-in-One") printers which typically include scanner, copier, and in some cases fax capabilities in addition to printing capabilities. To perform a scanning operation, image acquisition systems incorporating these products typically require the user to manually select or adjust a number of settings, usually in conjunction with a preview of the image to be stored, before the digital image of the scanned item is created.

As large numbers of digital images from different image sources are acquired, it becomes both more important and more difficult for the user to manage and organize these images in a manner that allows him or her to easily locate and access desired images.

Accordingly, it would be highly desirable to have a new and improved image processing system, and methods of scanning and organizing digital images, that more easily acquire images from optical scanner products and which organize images from all sources in a convenient manner.

SUMMARY OF THE INVENTION

In a preferred embodiment, the present invention provides a method of organizing digital images automatically. When a digital image is acquired, it is automatically converted into a data file with an associated date, and stored into a file system folder associated with that date. In another preferred embodiment, the present invention provides a method of optically scanning a target item automatically by using predefined scanner settings appropriate to a photographic image to scan the item.

BRIEF DESCRIPTION OF THE DRAWINGS

The above-mentioned features of the present invention and the manner of attaining them, and the invention itself, will be best understood by reference to the following detailed description of a preferred embodiment of the invention, taken in conjunction with the accompanying drawings, wherein.

DESCRIPTION OF THE PREFERRED EMBODIMENT

Referring now to the drawings, there is illustrated an image processing system constructed in accordance with the present invention which automatically converts an acquired digital image into a data file having an associated date, and stores the data file in a file system folder associated with that date. As best understood with reference to FIG. 1, the image processing system 10 includes at least one image source 20a-b, an image capture subsystem 30 coupled to the image sources 20, and a file system 40 coupled to the image capture subsystem 30. In operation, the image capture subsystem 30 requests, and one of the image sources 20 provides, at least one digital image. The image capture subsystem 30 associates a date with each digital image and automatically converts each digital image into a corresponding image file. The image capture subsystem 30 then automatically stores each image file in the file system 40 in a data folder which is associated with the date. The present invention advantageously makes it easier to locate digital images, handles images from all image sources in a similar manner, and provides a similar user interface for all image sources.

Figure 2:
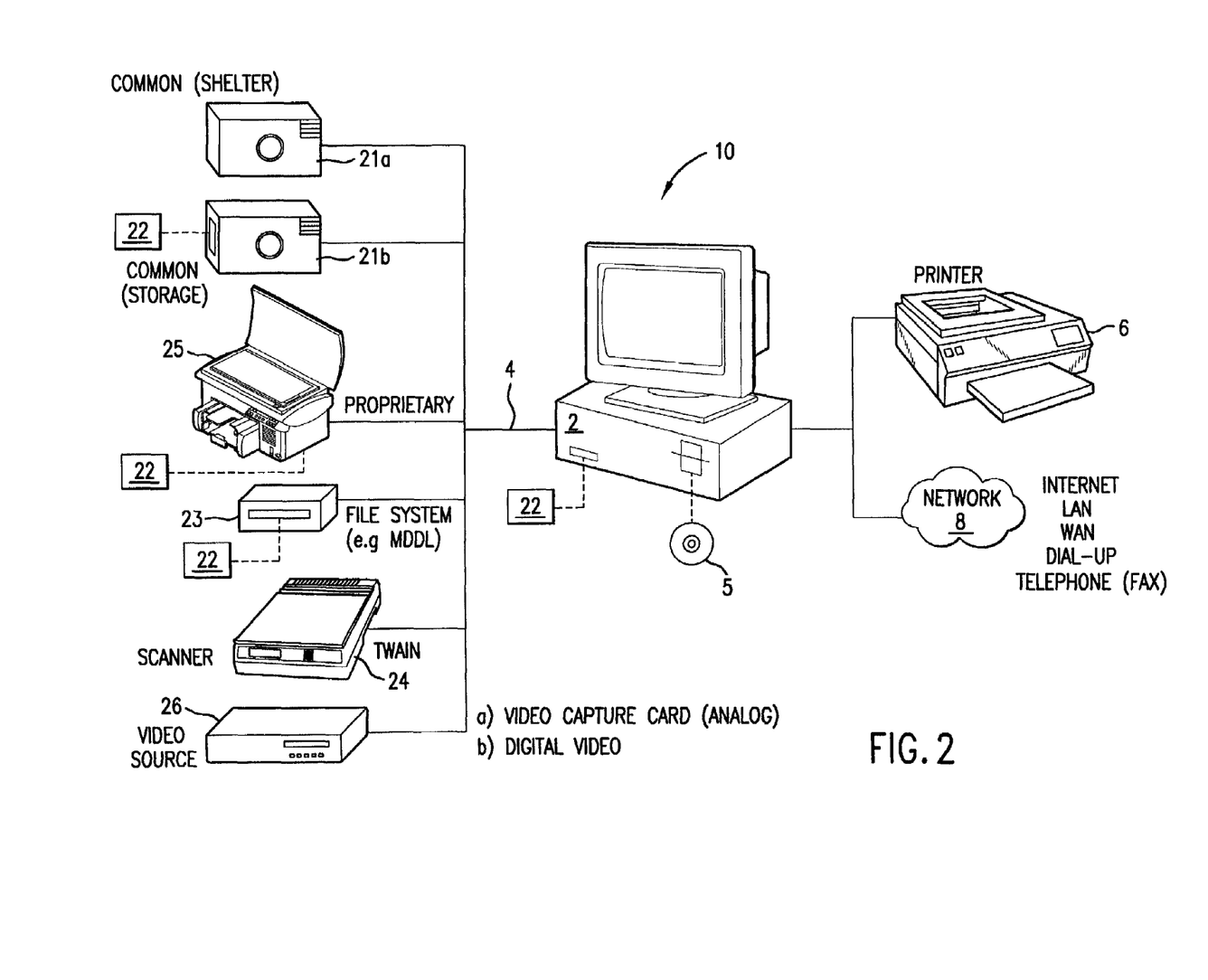
FIG. 2 is a perspective view of the image processing system of FIG. 1 illustrating a variety of image sources.

Considering now in further detail the image source 20, and with reference to FIG. 2, the image processing system typically includes a computing apparatus 2 to which the image sources are coupled over a communications interface 4. The communications interface 4 may be a different physical type (including, for example, serial, parallel, USB, IEEE1394 "Firewire", or the like) and may utilize a different standard or proprietary communications protocol for different types of image sources. The image source may be the image recording subsystem of a digital camera 21a, or may be the prerecorded image memory of a digital camera 21b. The prerecorded image memory is typically a flash memory device which is preferably removable from the camera 21b. The flash memory device may be a SmartMedia (trademark of the Solid State Floppy Disk Card Forum) device, a Memory Stick (trademark of Sony) device, a CompactFlash (trademark of the CompactFlash Association) device, or the like. The image source may also be a memory card reader 23 into which the memory card 22 is inserted. Such a card 22 preferably contains a file system, and the card 22 and reader 23 combination preferably implements a communications protocol such as the Mass Storage Device Class protocol or the like for the transfer of digital images to the computer 2. The image source may further be an optical scanner 24. The scanner 24 may communicate with the computer 2 using TWAIN protocol (version 1.9 of the protocol definition is available at http://www.twain.org) or a proprietary protocol. The image source device may additionally be a multifunction printer 25. Such a printer 25 preferably includes an optical scanner subsystem, which may also communicate with the computer 2 using TWAIN protocol or a proprietary protocol. Some printers 25 further include a memory card reader subsystem, operable as previously described for the memory card reader 23. A memory card reader subsystem may also be included in computer 2. Other types of image sources capable of providing digital images, such as video source 26, may also be connected to the computer 2. Video source 26 may be a video capture subsystem which converts an analog video signal into digital format, or may be a digital video device such as a DVD player, a digital camcorder, or the like. Any combination of these types of image sources 20 may be included in the image processing system 10, and the system 10 may contain more than one image source 20 of the same type.

The image processing system 10 may further include devices to which a digital image captured from an image source 20 can be sent. Such devices include a printer 6, which may be of any type capable of printing an image but which is preferably a color inkjet printer, and a communications interface (not shown; typically included in computer 2) which provides a connection to a network 8. The network 8 may be the telephone system for sending a fax, but is preferably the Internet. The communications interface may provide LAN, WAN, or dial-up connection to the Internet.

The computer 2 further contains a processor (not shown) for executing software instructions contained on a processor-readable medium. The medium may be a storage device 5, such as a CD-ROM, a floppy disk, or the like, which is inserted into the computer 2. Alternatively, the medium may be a memory internal to the computer (not shown) into which the software instructions have been downloaded, such as a hard drive, ROM, RAM, or the like.

Figure 1:
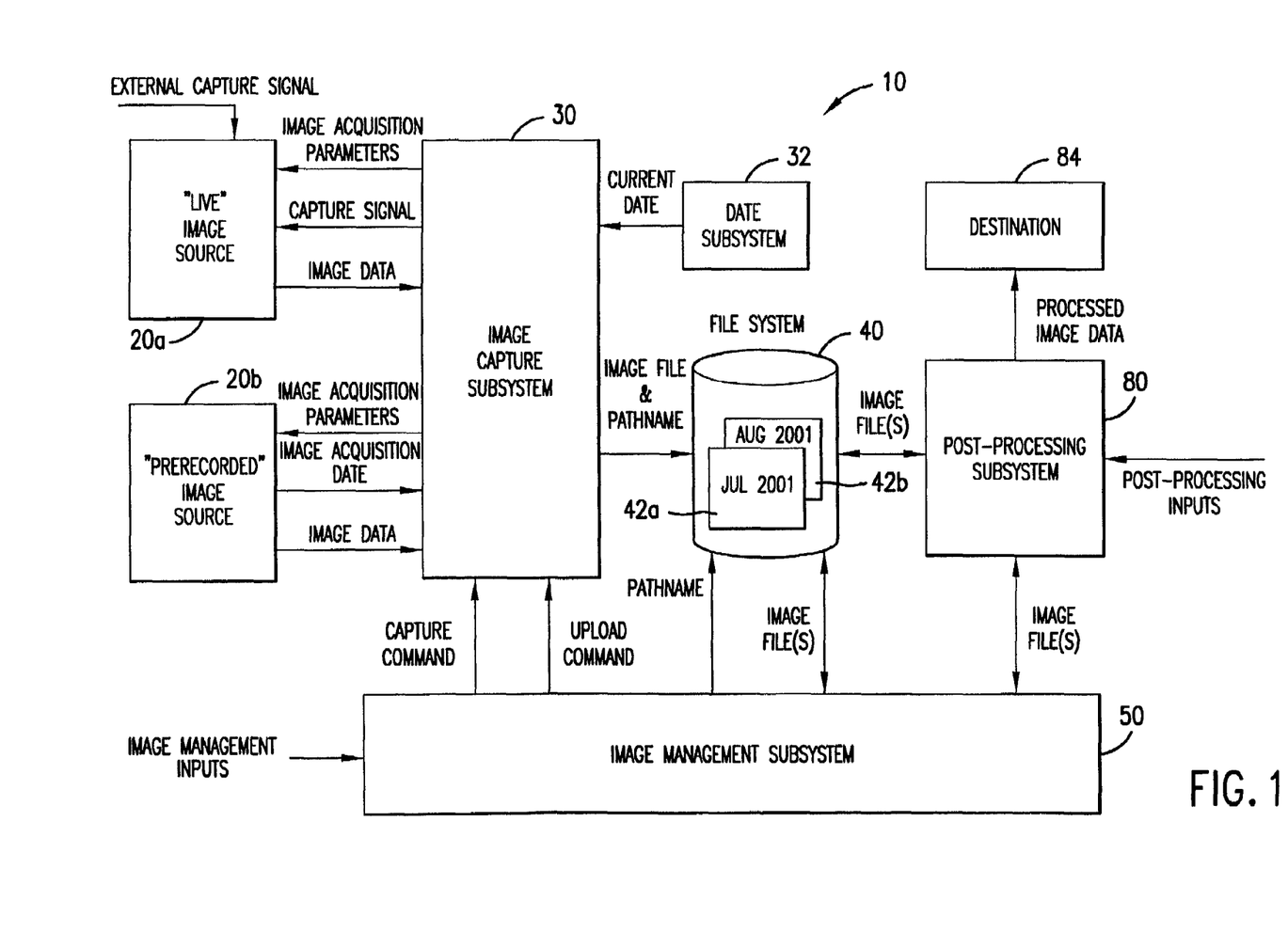
FIG. 1 is a block diagram of an image processing system according to the present invention.

Considering now in further detail the image capture subsystem 30, and with reference to FIG. 1, the image capture subsystem 30 requests and obtains digital images from an image source 20. Image sources are generally of two types. For "live" image sources 20a, the digital image is recorded by the image source 20a upon receipt of a capture signal from the image capture subsystem 30 and then received from the image source 20a by the image capture subsystem 30. As will be described subsequently in greater detail with reference to optical scanning, the image capture subsystem 30 can configure the image source 20a by providing image acquisition parameters appropriate for capturing photographic images to the source 20a.

For "prerecorded" image sources 20b, alternatively, one or more digital images have already been recorded by the image source 20b, and the prerecorded image data for one or more digital images is received from the image source 20b by the image capture subsystem 30. For each digital image, the image source 20b preferably provides an image acquisition date to the image capture subsystem 30. For example, where image source 20b is a memory card 22 containing images taken by a digital camera 21, the image acquisition date is the date on which the picture was taken by the camera 21. In some embodiments in which the image source 20b processes the prerecorded images before transferring the image data to the image capture subsystem 30, the image capture subsystem 30 may provide photo settings, such as a desired pixel height and width of the digital image, to the image source 20b; but in the preferred embodiment the prerecorded image data is provided to the image capture subsystem 30 without modification.

In addition to the image acquisition date, in some embodiments a date subsystem 32, such as a clock/calendar or a timer, provides the image capture subsystem 30 upon request with the current date. Both the current date and the image acquisition date may also include time. As will be described subsequently in greater detail, the image capture subsystem 30 can use either the current date or the image acquisition date to determine the data folder 42 of the file system 40 in which the image date file will be stored.

Figure 3:
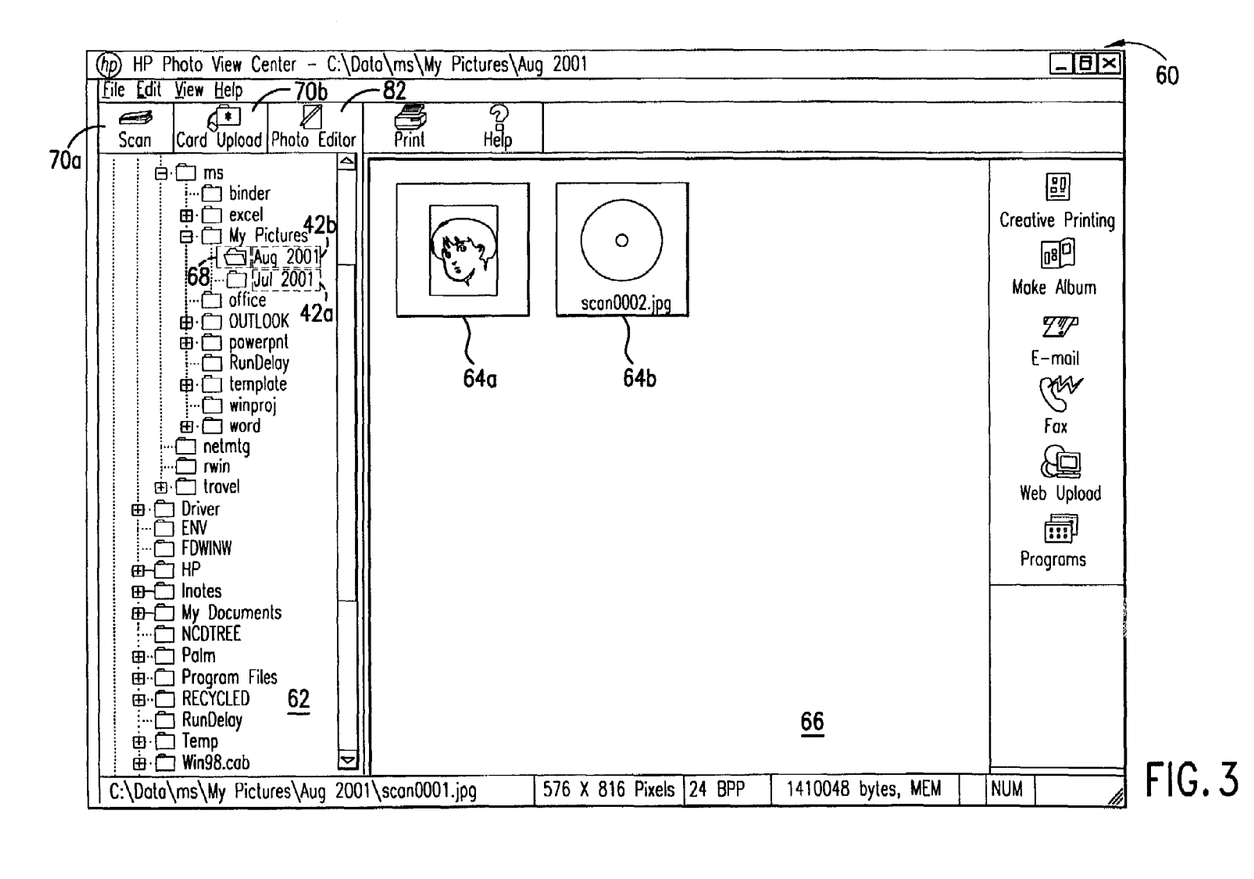
FIG. 3 is an illustration of an exemplary computer monitor display generated by the image processing system of FIG. 1.

Considering now additional subsystems of a preferred embodiment of the image processing system 10, and with reference to FIGS. 1 and 3, the image processing system 10 preferably includes an image management subsystem 50 coupled to the image capture subsystem 30 and the file system 40. The image management subsystem 50 provides for viewing on a monitor of the computer 2 the data folders in the file system 40, such as exemplary data folders 42a-b, and for viewing the image files in a specified data folder 42a-b. An exemplary view 60 illustrates data folders 42a-b in a folder window 62, and thumbnail views of image files 64a-b in a file window 66. Image files 64a-b are contained in the data folder 42b named "Aug 2001", as indicated by the "open folder" icon 68 adjacent to folder "Aug 2001" 42b in the folder window 62. The image management subsystem 50 obtains the data folders and image files from the file system 40 by supplying a pathname or the like to the file system 40, as known to those skilled in the art. The thumbnail view typically is the most convenient one for allowing the user to quickly and easily identify images of interest. However, instead of thumbnail views, the image management subsystem 50 may alternatively display textual information about the image files in the specified folder 42a-b, which may be done in a more compact manner and thus allow more files to fit in the file window 66.

The image management subsystem 50 further signals the image capture subsystem 30 to acquire images from the image source 20. This signaling is typically provided in response to a user input such as operation of the "Scan" control 70a or the "Card Upload" control 70b (buttons on program). In this exemplary configuration, operation of the "Scan" control 70a results in the image management subsystem 50 generating a capture command to the image capture subsystem 30, which in turn issues a capture signal to a "live" image source 20a such as scanner 24 or the optical scanner subsystem of multifunction printer 25. In some embodiments, image acquisition parameters to be used by the image source 20a in acquiring the image are also communicated to the source 20a. These image acquisition parameters include predefined settings which are appropriate to a photographic image.

In an alternate embodiment, an external capture signal may be supplied to the image source 20 in order to acquire an image or images. Where the image source is a "live" image source 20a such as scanner 24 or the optical scanner subsystem of multifunction printer 25, the external capture signal is typically generated by the user operating a control, such as a pushbutton, of the live image source 20a.

With regard to acquiring images from the "prerecorded" image source 20b, operation of the "Card Upload" control 70b results in the image management subsystem 50 acquiring the prestored images from "prerecorded" image source 20b, which is preferably memory card 22. As will be described subsequently in greater detail, the image capture subsystem 30 automatically stores each digital image obtained from image source 20a-b on the file system 40. Each digital image is stored on the file system 40 as an image file located in a data folder associated with either the current date or the image acquisition date. In some "prerecorded" image source 20b embodiments which further process the stored image prior to sending it to the image capture subsystem 30, the image acquisition parameters used by the image source 20b in further processing the stored image are also communicated to the source 20b. These image acquisition parameters include predefined settings which are appropriate to a photographic image.

Some embodiments of the image processing system 10 also include a post-processing subsystem 80 coupled to the image management subsystem for post-processing at least one selected one of the image files. The post-processing system 80 is preferably an application program executable by the processor of computer 2. An exemplary application program is a photo editor which polishes the image as requested by post-processing inputs from a user. Such image polishing typically include enhancing the image by cropping or adjusting brightness or color. Operation of a post-processing system 80 such as the photo editor is preferably invoked by a user input to the image management system 50 such as the operation of a "Photo Editor" control 82. The image management system 50 may provide the pathname of the image file and/or the image file itself to the post-processing system 80. Some embodiments of the post-processing system 80 are coupled to the file system 40 for accessing image files. After post-processing has been performed, the post-processing subsystem 80 may store the modified image file on the file system 40, or provide the modified image file to the image management subsystem 50 for storage on the file system 40.

Other exemplary post-processing subsystems 80 include creative printing applications such as a greeting card generation program which includes digital images on the greeting card; photo album applications which create photo albums from a collection of digital images; e-mail programs which incorporate digital images into e-mail messages; photo web site upload utilities which store digital images on photo-sharing web sites; fax programs which fax digital images to specified telephone recipients; and the like.

The image processing system 10 may further include an image destination 84 for receiving output data representing processed images from a post-processing subsystem 80. The destination may include a peripheral device such as a printer 6, the printing subsystem of multifunction printer 25, or an interface connection to network 8.

Figure 4:
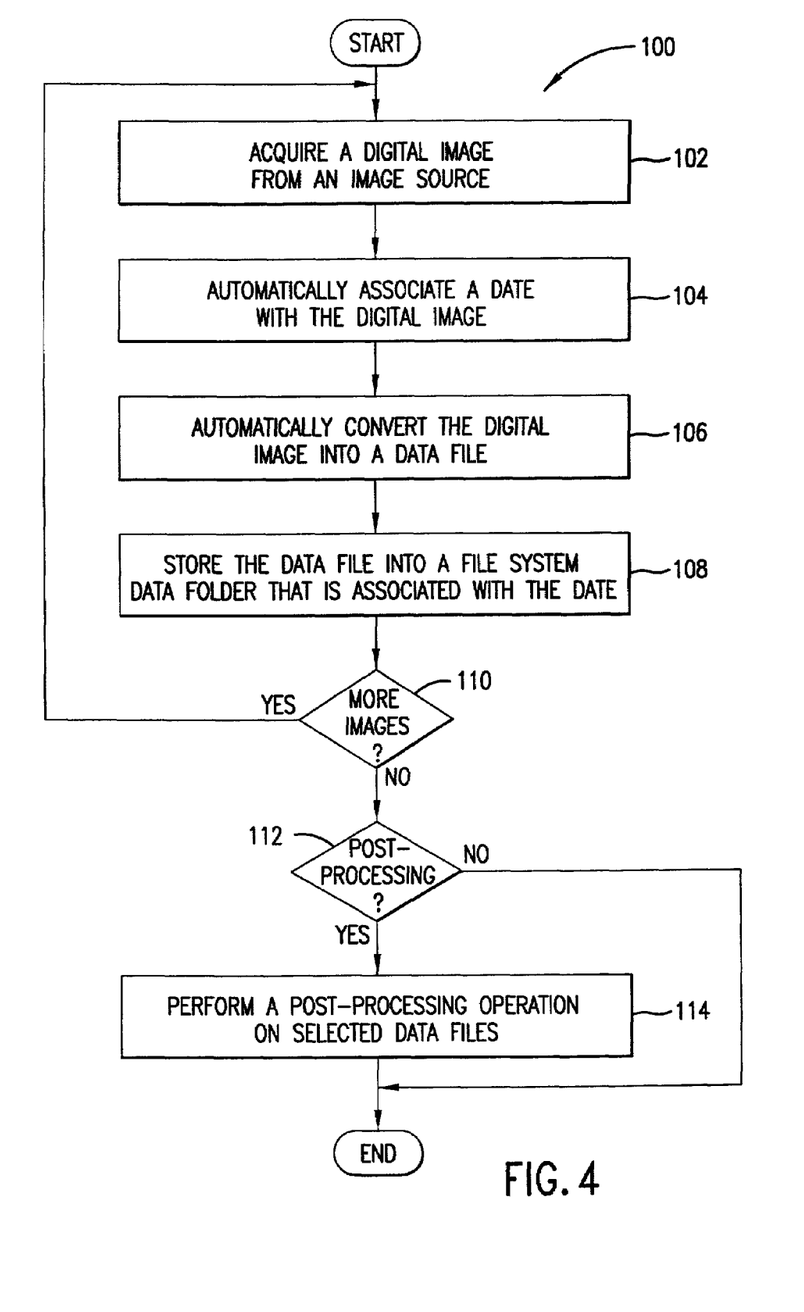
FIG. 4 is a flowchart of a method of automatically organizing digital images usable with the image processing system of FIG. 1.

Another embodiment of the present invention, as best understood with reference to FIG. 4, is a method of automatically organizing digital images. The method 100 begins at 102 with acquiring a digital image. The image is preferably acquired from an image source 20.

At 104, a date is automatically associated with the digital image. One preferred date is the capture date when the digital image was captured by the image source 20. Another preferred date is the storage date when the digital image was converted into a data file in the folder 42 on the file system 40.

At 106, the digital image is automatically converted into a data file.

At 108, the data file is stored into a data folder, such as folder 42, of a file system 40. The folder 42 is associated with the date, and typically selected from a set of data folders. If no folder 42 associated with the date as yet exists on the file system 40, such a folder 42 is created. In the preferred embodiment, the data folder is associated with a particular month and year, such as folder 42a for July 2001 and folder 42b for August 2001. For example, for a particular digital image that has a capture date of Jul. 15, 2001 and a storage date of Aug. 23, 2001, if the associated date is the capture date, the image file will be stored into the July 2001 folder 42a, alternatively, if the associated date is the storage date, the image file will be stored into the August 2001 folder 42b. Such a folder organization advantageously organizes the digital images by date, thus helping the user to easily and quickly locate desired images for viewing or post-processing.

If more images are to be acquired ("Yes" branch of 110), then the method branches to 102 to acquire these images. If no more images are to be acquired ("No" branch of 110) and no post-processing of images is to be done ("No" branch of 112), then the method ends. If post-processing of images is to be done ("Yes" branch of 112), then at 114 a post-processing operation is performed on selected data files stored on the file system 40. Some exemplary post-processing operations associated with the method 100 have heretofore been described with reference to the post-processing subsystem 80.

In the preferred embodiment, the image processing system 10 includes processor-executable software instructions to implement method 100. These software instructions are included in one or more processor-readable media located in computer 2 and/or printer 6. In some embodiments, the software instructions are supplied to computer 2 from storage device 5

Figure 5:
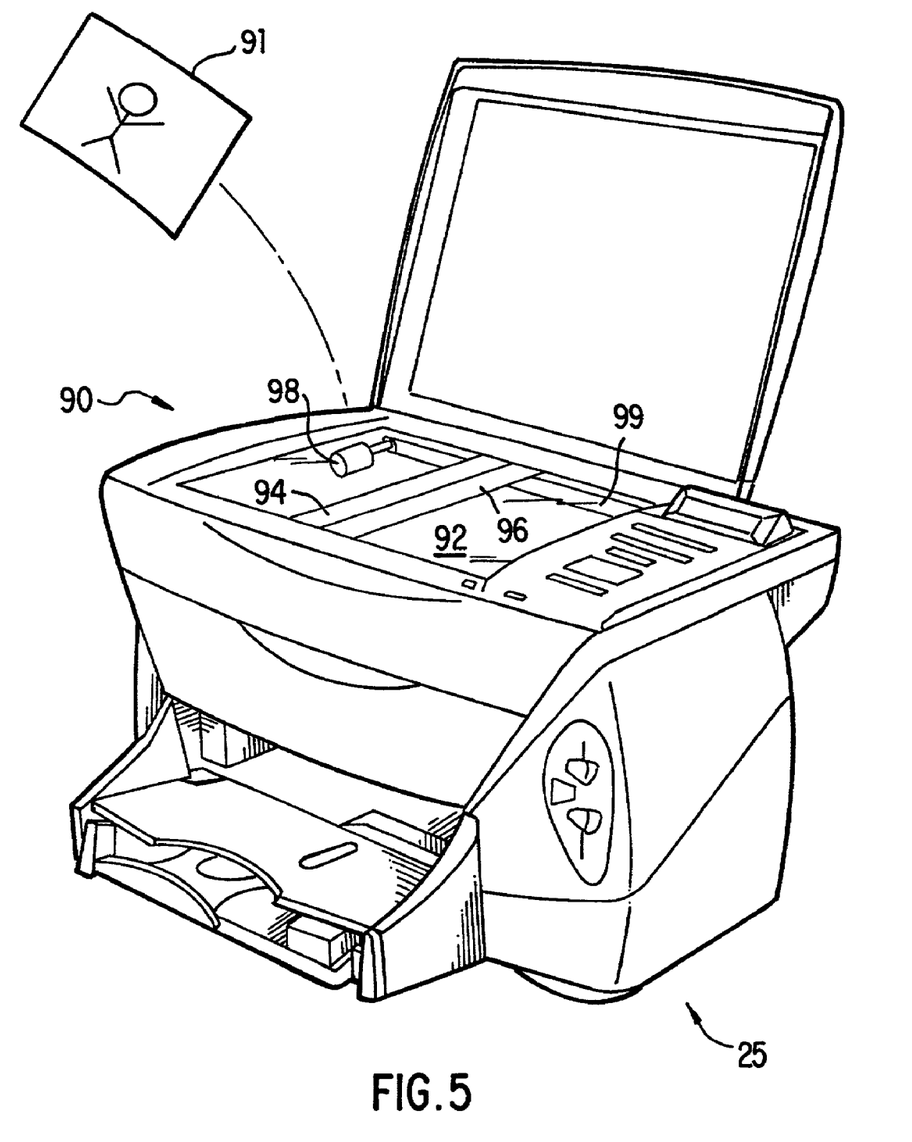
FIG. 5 is a perspective view of a multifunction printer usable in the image processing system of FIG. 1.

Considering now in further detail the multifunction printer 25, and with reference to FIG. 5, printer 25 includes an optical scanner portion 90. This portion 90 is also functionally and structurally similar to optical scanner 24. In the preferred embodiment, the scanner portion 90 is a flatbed scanner. In a flatbed scanner, a target item 91 to be scanned is placed on (or in alternate embodiments automatically fed to) a large horizontal glass or transparent plastic window or platen 92. The platen 92 preferably provides a scannable area of 8.5 inches by 11 inches or greater, and can accommodate target items 91 which are up to the size of the platen 92. The target item 91 is typically a photograph on a single sheet of media such as photographic paper, but could also be a transparency, a photo bound in a book, or a substantially flat physical object that is placed on the platen 92. In a flatbed scanner, the target item 91 is maintained in a stationary position during scanning.

A light source 96 is directed toward the target item 91 while an optical scanning array 94 that extends across the entire width of the platen 92 reciprocates longitudinally over the target item 91. Preferably the light source 96 is mounted so as to be movable with the scanning array 94. The light source 26 may be defined by a tubular fluorescent light, for example. The array 94 detects light reflected from the target item during reciprocation in order to generate a digital image of the target item 91. The array 94 may be an array of photo detectors or charge coupled device (CCD) elements which define imaging pixels and are able to generate signals indicative of the different colors that were detected at different locations of the scanned target item 91. The scanner portion 90 further includes a motor 98 to move the scanning array 94 and light source 96 together along the scanning path, typically by driving a belt or chain 99. The motor 98 is preferably a stepper motor, which can be controlled to a high positional accuracy.

In an alternate embodiment, the optical scanner portion 90 is a sheet-fed scanner. A sheet-fed scanner differs from a flatbed scanner in that the scanning array 94 is stationary in a sheet-fed scanner, and the target item 91 (which is typically limited to a single sheet of media) is moved past the array 94.

Figure 6:
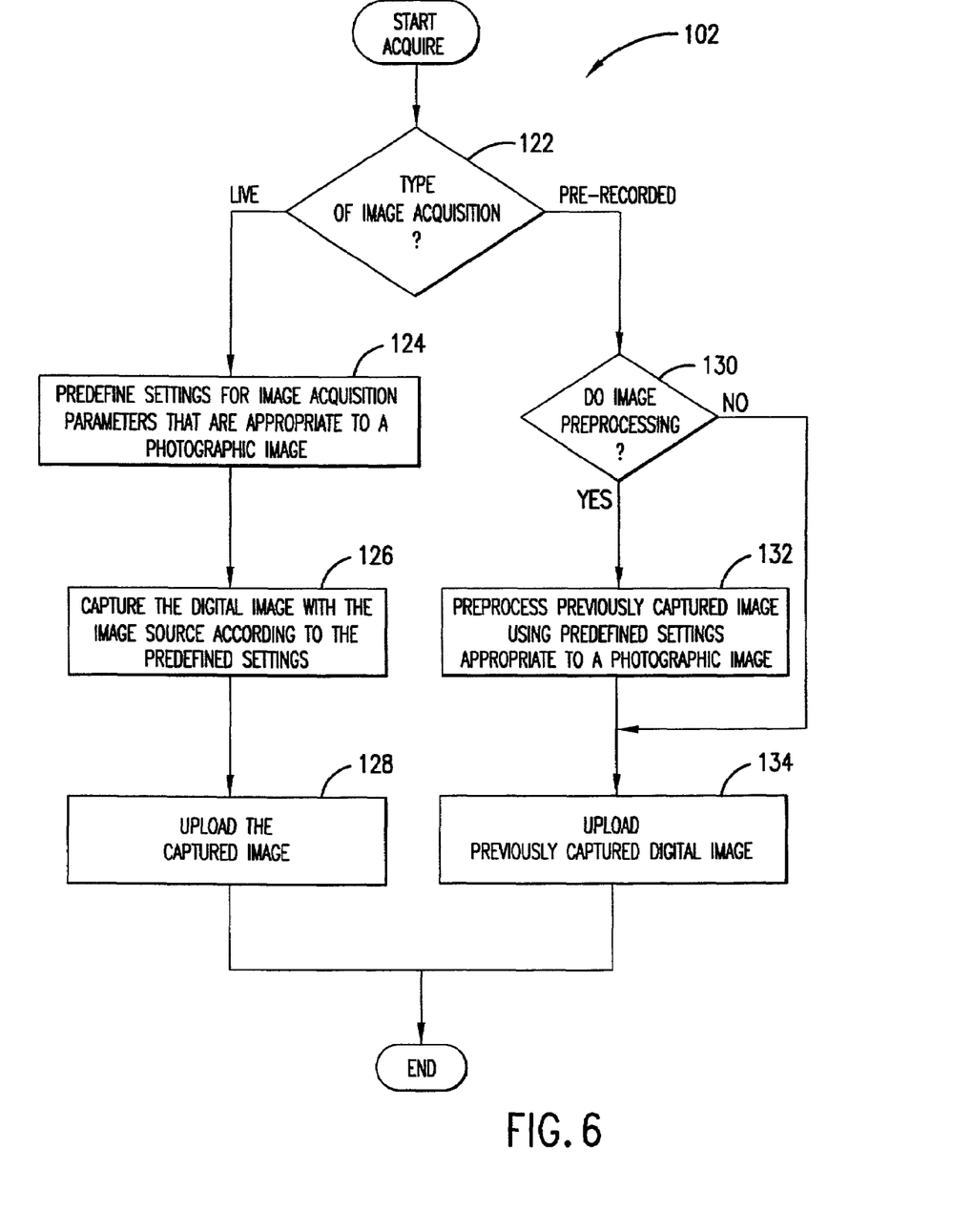
FIG. 6 is a more detailed flowchart of the image acquisition portion of the method of FIG. 4.

Considering now in further detail the acquiring 102 of the digital image from the image source 20, with reference to FIG. 6 and bearing in mind the preceding discussion of the optical scanner portion 90, the acquiring 102 determines at 122 the type of image acquisition to be performed. If the image to be acquired is from a "live" image source 20a such as the optical scanner portion 90 ("Live" branch of 122), then at 124 settings appropriate to a photographic image for image acquisition parameters are predefined. At 126, a digital image is captured with the image source 20a according to the predefined settings. Typical predefined settings will be described subsequently. Where the image source 20a is the optical scanner portion 90 or the optical scanner 24, the target item 91 (which is positioned image side down on the platen 92) is optically scanned using the predefined settings to form the digital image of the target item 91. At 128, the digital image is uploaded and acquiring 102 completes.

If the image to be acquired has already been captured ("Pre-Recorded" branch of 122), then at 130 it is determined whether image preprocessing will be performed before the acquisition. If the "prestored" image source 20b is capable of image preprocessing and image preprocessing is to be performed ("Yes" branch of 130), then at 132 the previously captured image is preprocessed using predefined settings appropriate to a photographic image for the image acquisition parameters. After the preprocessing 132, or if no preprocessing is to be performed ("No" branch of 130), then at 134 the previously captured digital image is uploaded and the acquiring 102 completes. In embodiments where the "prestored" image source 20b is capable of providing information other than digital images, the uploading 134 may include uploading this additional information (and typically storing it on the file system 40 as a non-image file), or alternatively may include filtering out the additional information so that only images are uploaded.

Figure 7:
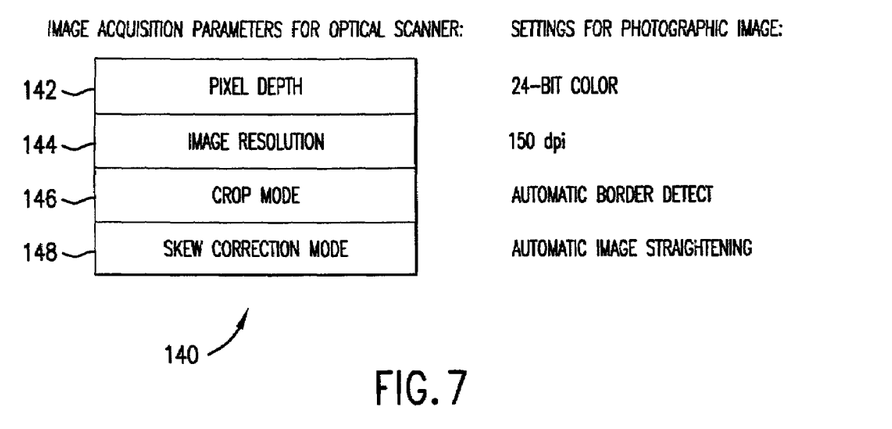
FIG. 7 is a schematic representation of image acquisition parameters associated with the image acquisition method portion of FIG. 6.

Considering now in greater detail the predefined settings for image acquisition parameters, and with reference to FIG. 7, each different type of image source 20 may have different parameters and/or different settings for those parameters. For an optical scanner portion 90 of a multifunction printer 25, or for an optical scanner 24, a preferred set of image acquisition parameters 140 include a pixel depth parameter 142, an image resolution parameter 144, a crop mode parameter 146, and a skew correction mode parameter 148. Preferred settings for these parameters appropriate to photographic images include a pixel depth 142 of 24-bit color, an image resolution 144 of 150 dots per inch (dpi), a crop mode 146 of automatic border detection, and a skew correction mode 148 of automatic image straightening. These settings cooperate to allow a digital image of a target item 91 placed on the platen 92 to be converted into a photographic-quality image file without requiring manual user intervention, such as a preview scan and subsequent interactive tweaking of various image parameters, before the photographic-quality image file is produced. Use of the predefined image acquisition parameter settings thus allows image scanning to be performed in a one-step operation that is analogous to how a digital image is captured with a "point-and-shoot" digital camera.

From the foregoing it will be appreciated that the image processing system and methods provided by the present invention represent a significant advance in the art. Although several specific embodiments of the invention have been described and the invention is not limited to the specific methods, forms, or arrangements of parts so described and illustrated. The invention is limited only by the claims.

What is claimed is:

1. A method of optically scanning a target item, comprising:
   configuring an optical scanning arrangement with predefined settings for scanning parameters appropriate to a photographic image;
   initiating a scanning operation;
   in response to the initiating, optically scanning the target item using the predefrned settings to form a digital image of the target item; and
   converting the digital image into a data file, wherein the scanning and the converting are performed automatically without intervention by a user, and wherein the predefined settings are not defined by the user.

2. The method of claim 1, further including:
   automatically storing the data tile.

3. The method of claim 2, wherein the storing includes storing the data file on a file system.

4. The method of claim 3, further including specifying a date, and wherein the storing further includes storing the data file on the file system in a folder having a folder name indicative of the date.

5. The method of claim 4, wherein the folder name is indicative of a particular month and year.

6. The method of claim 4, wherein the file system has no folder having a folder name indicative of the date, further including:
   creating the folder having the folder name indicative of the date.

7. The method of claim 4, wherein the data file is a plurality of data files and wherein the file system has a plurality of folders, further including:
   viewing a representation of the plurality of folders; and
   viewing a representation of the data files in one of the folders.

8. The method of claim 1, wherein the scanning parameters are selected from the group consisting of pixel depth, resolution, crop mode, and skew correction mode.

9. The method of claim 8, wherein the scanning parameter settings appropriate to a photographic image includes:
   pixel depth=24-bit colon
   resolution=150 dots per inch;
   crop mode=automatic border detection; and
   skew correction mode=automatic image straightening.

10. An image processing system, comprising:
    at least one image source, each image source for providing at least one digital image upon request;
    an image capture subsystem coupled to the at least one image source for requesting and receiving the at least one digital image from the at least one image source, the image capture subsystem further for associating a date with each digital image and automatically converting each digital image into a corresponding image file; and
    a file system coupled to the image capture subsystem for automatically storing each image file in a selected one of a plurality of data folders, the selected data folder having a folder name indicative of the date.

11. The image processing system of claim 10, comprising:
    an image management subsystem coupled to the image capture subsystem and the file system for viewing the plurality of data folders and the image files in a specified data folder.

12. The image processing system of claim 11, comprising:
    a post-processing subsystem coupled to the image management subsystem for post-processing at least one selected one of the image files.

13. The image processing system of claim 12, wherein the post-processing subsystem is further coupled to the file system for accessing the selected ones of the image files.

14. The image processing system of claim 12, comprising:
    an image destination coupled to the post-processing subsystem for receiving output data corresponding to at least one selected one of the image files.

15. The image processing system of claim 10, wherein the date is an image acquisition date provided by the image source.

16. The image processing system of claim 10, wherein the date is a current date provided by a date subsystem coupled to the image capture subsystem.

17. The image processing system of claim 10, wherein the at least one image source is an optical scanner, and wherein the image capture subsystem provides predefined settings appropriate to a photographic image to the optical scanner for use in providing the at least one digital image.

18. A processor-readable medium having processor-executable instructions thereon which, when executed by a processor, cause the processor to: acquire a digital image from an image source;

automatically convert the digital image into a data file having a date associated with the digital image; and store the data file into a data folder of a file system, the folder having a folder name indicative of the date.

19. A processor-readable medium having processor-executable instructions thereon which, when executed by a processor, cause the processor to:

configure an optical scanning arrangement with predefined settings for scanning parameters appropriate to a photographic image;

detect an initiation of a scanning operation;

in response to the initiation, optically scan the target item using the predefined settings to form a digital image of the target item; and convert the digital image into a data file, wherein the instructions to scan and convert are performed automatically after the initiation without intervention by a user, and wherein the predefined settings are not defined by the user.

20. An image processing system, comprising:

means for configuring an optical scanning arrangement with predefined settings for scanning parameters appropriate to a photographic image;

means for initiating a scanning operation;

means for optically scanning the target item using the predefined settings to form a digital image of the target item; and means for converting the digital image into a data file, wherein the scanning and the converting are performed automatically without intervention by a user, and wherein the predefined settings are not defined by the user.

21. An image processing system, comprising:

at least one image source, each image source for providing at least one digital image upon request;

an image capture subsystem coupled to the at least one image source which requests and receives the at least one digital image from the at least one image source, associates a date with each image, and automatically converts each image into a corresponding image file; and a file system coupled to the image capture subsystem which receives each image file from the image capture subsystem and automatically stores each image file in a selected one of a plurality of data folders, the selected data folder having a folder name indicative of the date.

* * * * *

UNITED STATES PATENT AND TRADEMARK OFFICE
CERTIFICATE OF CORRECTION

PATENT NO. : 7,499,200 B2
APPLICATION NO. : 09/942503
DATED : March 3, 2009
INVENTOR(S) : David O. Hamilton et al.

It is certified that error appears in the above-identified patent and that said Letters Patent is hereby corrected as shown below:

In column 5, line 49, delete "vet" and insert -- yet --, therefor.

In column 7, line 46, after "and" insert -- illustrated, --.

In column 7, line 58, in Claim 1, delete "predefrned" and insert -- predefined --, therefor.

In column 7, line 65, in Claim 2, delete "tile." and insert -- file. --, therefor.

In column 8, line 25, in Claim 9, delete "colon" and insert -- color; --, therefor.

Signed and Sealed this

Twenty-first Day of July, 2009

JOHN DOLL
*Acting Director of the United States Patent and Trademark Office*